United States Patent Office 2,863,786
Patented Dec. 9, 1958

2,863,786

ODOR-FREE LIQUID CONJUGATED DIENE POLYMERS

Eugene D. Guth and Homer M. Fox, Bartlesville, Okla., assignors to Phillips Petroleum Company, a corporation of Delaware No Drawing. Application December 4, 1956
Serial No. 626,079

15 Claims. (Cl. 106—285)

This invention relates to odor-free, liquid conjugated diene polymer compositions. In a further aspect this invention relates to coating compositions, such as paints or varnishes, prepared from liquid polybutadiene or other liquid conjugated diene polymers, the resulting coating composition being substantially odor free.

Since the issuance of Patent Number 2,631,175 to W. W. Crouch, the use of liquid polymers of conjugated dienes produced as disclosed therein has steadily increased. A major application of such polymers is in the protective coating field. Varnishes based on these liquid polymers can be air-dried to yield finishes of high gloss and hardness or baked at elevated temperatures to produce tough, flexible films possessing excellent chemical resistance and thermal stability. Furthermore, these liquid polymers function effectively as modifying agents for improving the bodying and drying characteristics of conventional oils and alkyds.

One objection to the use of these polymers in coating compositions is their characteristic odor, sometimes described as an aromatic odor or as the odor of naphthalene. This odor is readily apparent in the liquid composition and in a varnish prepared therefrom. When applied in a coating, the odor persists until the coating is dry.

The following are objects of our invention:

An object of our invention is to provide odor-free, liquid conjugated diene polymers. A further object of our invention is to provide varnish and paint compositions prepared from liquid conjugated diene polymers, said coating compositions being substantially odor-free.

Other objects and advantages of our invention will be apparent to one skilled in the art upon reading the accompanying disclosure.

We have discovered that the odor of liquid conjugated diene polymers can be substantially eliminated by treating the liquid polymer with hydrazine or the methyl or ethyl derivatives of hydrazine. An advantage of this invention results in the fact that a very small amount of hydrazine or derivative thereof is necessary to provide an odor-free liquid diene composition. As little as 0.02 part by weight per 100 parts by weight of the liquid polymer is frequently satisfactory. Generally not over 0.2 part by weight is required although up to 2 parts by weight are sometimes used. Obviously, greater amounts can be used but this is not frequently done for two reasons. First, the smallest amount suitable is the most economic and, second, the use of a large excess will produce the characteristic hydrazine odor in the composition and this is not desired.

As stated, the polymers used in the production of the compositions of our inventions are preferably prepared according to the method of Crouch 2,631,175. This process is a mass polymerization one using finely divided sodium which produces a liquid polymeric material free from solid matter having an average molecular weight in the range of 500 to 5000. The product is substantially transparent and colorless. The polymers have a viscosity of at least 100 Saybolt furol seconds at 100° F., this ranging up to approximately 6000 Saybolt furol seconds at 100° F.

While liquid polybutadiene is the material used in the examples of this application, the invention is applicable to polymers of other conjugated dienes such as isoprene, piperlyene, 2,3-dimethylbutadiene, and other conjugated dienes containing up to 8 carbon atoms per molecule. The invention is also applicable to copolymers of one or more of these dienes with vinyl compounds such as styrene, methyl substituted styrene, the vinyl pyridines, the acrylates, and the like. A particularly preferred copolymer is a copolymer of 1,3-butadiene and styrene. Where copolymers are used, the major polymerizable ingredient is the conjugated diene and this component is present in an amount which exceeds 50 percent by weight of the monomeric material.

Spirit varnishes are prepared by diluting the liquid conjugated diene polymer such as polybutadiene, with a solvent or thinner. Conventional thinners for paint and varnish are applicable i. e., coal tar hydrocarbons, petroleum distillates, turpentine fractions and the like. The amount of thinner is generally within the range of 20 to 80 percent of the total composition on a weight basis, or, stated in other words, 25 to 400 parts by weight of thinner are used per 100 parts of the liquid polymer. Although films prepared from these liquid conjugated diene polymers will dry in the absence of promoters, the addition of conventional drier compositions will materially reduce the drying time and will improve the ultimate film hardness. The amount of drier is, of course, dependent upon the the properties desired in the final composition but this amount is generally within the range of 0.02 to 3 parts by weight per 100 parts of the liquid polymer. Driers which are commonly used are lead, cobalt, zinc, and manganese, in the form of the naphthenate or other salts.

In preparing such a varnish the thinner is mixed with the liquid polymer and the driers are subsequently added. Oftentimes, it is desirable to warm the mixture to 200 to 250° F. to facilitate solution and to produce a homogeneous mixture.

As stated previously, the amount of hydrazine, methyl hydrazine, or ethyl hydrazine ranges from 0.02 to 2 parts by weight per 100 parts by weight of the liquid polymer although, in general, it is unnecessary to use more than 0.2 part by weight and 0.02 to 0.2 part constitutes a preferred range.

Another important use of these liquid polymers and one wherein the deodorizing subject of the present invention is important, is where the liquid conjugated diene polymer is used as a modifying agent for drying oils and alkyd resins. The drying and semi-drying oils used include linseed oil, tung oil, soybean oil, oiticica oil, castor oil, cottonseed oil, and perilla oil.

Varnish compositions of the present invention are applied to work, metal, and surfaces of other types by any suitable means such as brushing, spraying, dipping, roller coating, and the like. Following application of the varnish or paint, the material is generally baked at a temperature between 200 and 500° F., preferably between 300 and 500° F. for a period in the range of 5 to 90 minutes although the baking period seldom exceeds 60 minutes.

The hydrazine, methyl hydrazine, or ethyl hydrazine added to eliminate the odor of the liquid polymer can be added at any stage following the production and recovery of the liquid polymer. Generally it is added during the varnish or paint formulation although it is often added to the liquid polymer before storage or transportation.

The following examples are illustrative of our invention and the manner in which it may be practiced.

*Example I*

A liquid homopolymer of 1,3-butadiene was prepared according to the mass polymerization process of Patent No. 2,631,175. This polymer, after removal of solvent therefrom, had a viscosity of 1500 Saybolt Furol seconds at 100° F. To 100 parts by weight of this liquid polymer were added 100 parts by weight of mineral spirits and as driers, 0.8 part by weight of cobalt naphthenate, 0.8 part by weight of manganese naphthenate, and 0.4 part by weight of lead naphthenate. This mixture was stirred to provide a homogeneous solution and divided into four portions. Hydrazine was added to three of these portions in amounts of, respectively, 0.1, 0.2, and 2 parts by weight of hydrazine per 100 parts by weight of the liquid polybutadiene. No hydrazine was added to the fourth portion which served as the control.

Separate pieces of wood were painted with each of the resulting varnishes. Each painted piece of wood was subjected to the following series of tests in order to demonstrate the odor control by the use of hydrazine. Following the painting, each sample was placed in a separate closed vessel for 24 hours, was allowed to dry in air for a period of time, and was then returned to the closed test tube in order to permit the odor concentration to build up. This procedure was repeated a series of times until all of the samples had completely dried. Following each 24 hour period in the closed vessel, the intensity of odor of each piece was observed by three independent observers. In each case, each observer was able to select the control sample as the one having the obnoxious odor.

Pieces of metal were likewise painted with a portion of each of the four varnish compositions and, again, the observers were able to pick out the control at once.

In each case the difference in odor became less noticeable as the material dried but the characteristic odor of the polybutadiene is obnoxious and the odor present during the drying is a problem which it has been difficult to overcome.

*Example II*

To another portion of the same liquid polybutadiene, 3 percent by weight hydrazine was added and the mixture was stored at 140° F. for two weeks. At the end of this time the vessel was opened and it was apparent that the liquid polybutadiene had lost its characteristic odor. Of greater importance, is the fact that this odor did not return to the sample after two days of standing exposed to air.

As many possible embodiments can be made from our invention without departing from the scope thereof, it is to be understood that all matter set forth herein is to be interpreted as illustrative and not unduly limiting the invention.

We claim:

1. A composition of matter comprising a liquid polymer of a conjugated diene containing 4 to 8 carbon atoms and a compound selected from the group consisting of hydrazine and methyl and ethyl derivatives thereof, the amount of said hydrazine or derivative thereof being sufficient to eliminate the odor of the liquid polymer but insufficient to produce an objectionable hydrazine odor.

2. The composition of claim 1 wherein said liquid polymer is selected from the group consisting of homopolymers of 1,3-butadiene and copolymers of 1,3-butadiene and styrene.

3. A composition of matter comprising a liquid homopolymer of 1,3-butadiene suitable for use in a varnish composition and a compound selected from the group consisting of hydrazine and methyl and ethyl derivatives thereof, the amount of said hydrazine or derivative thereof being sufficient to eliminate the odor of the liquid polymer but insufficient to produce an objectionable hydrazine odor.

4. A composition of matter comprising a liquid homopolymer of 1,3-butadiene suitable for use in a varnish composition and hydrazine, the amount of said hydrazine being sufficient to eliminate the odor of the liquid polymer, but insufficient to produce an objectionable hydrazine odor.

5. A composition of matter comprising a liquid polymer of a conjugated diene containing 4 to 8 carbon atoms and a compound selected from the group consisting of hydrazine and methyl and ethyl derivatives thereof, the amount of said hydrazine or derivative thereof being within the range of 0.02 to 2 parts by weight per 100 parts by weight of said polymer.

6. The composition of claim 5 wherein said liquid polymer is selected from the group consisting of homopolymers of 1,3-butadiene and copolymers of 1,3-butadiene and styrene.

7. A composition of matter comprising a liquid polymer of a conjugated diene containing 4 to 8 carbon atoms and a compound selected from the group consisting of hydrazine and methyl and ethyl derivatives thereof, the amount of said hydrazine or derivative thereof being within the range of 0.02 to 0.2 part by weight per 100 parts by weight of said polymer.

8. A composition of matter comprising a liquid homopolymer of 1,3-butadiene suitable for use in a varnish composition and a compound selected from the group consisting of hydrazine and methyl and ethyl derivatives thereof, the amount of said hydrazine or derivative thereof being within the range of 0.02 to 2 parts by weight per 100 parts by weight of said polymer.

9. A composition of matter comprising a liquid homopolymer of 1,3-butadiene suitable for use in a varnish composition and a compound selected from the group consisting of hydrazine and methyl and ethyl derivatives thereof, the amount of said hydrazine or derivative thereof being within the range of 0.02 to 0.2 part by weight per 100 parts by weight of said polymer.

10. A composition of matter comprising a liquid homopolymer of 1,3-butadine suitable for use in a varnish composition and hydrazine, the amount of said hydrazine being within the range of 0.02 to 2 parts by weight per 100 parts by weight of said polymer.

11. A composition of matter comprising a liquid homopolymer of 1,3-butadine suitable for use in a varnish composition and hydrazine, the amount of said hydrazine being within the range of 0.02 to 0.2 part by weight per 100 parts by weight of said polymer.

12. A varnish composition comprising, on a weight basis:

| | Parts |
|---|---|
| Liquid 4–8 carbon conjugated diene polymer | 100 |
| Hydrazine | 0.1–2 |
| Thinner | 25–400 |
| Drier | 0.02–3 |

13. A varnish composition comprising, on a weight basis:

| | Parts |
|---|---|
| Liquid polybutadiene | 100 |
| Hydrazine | 0.1–2 |
| Thinner | 25–400 |
| Drier | 0.02–3 |

14. A varnish composition comprising approximately 100 parts by weight of liquid polybutadine and on a weight basis, the following ingredients:

| | Parts |
|---|---|
| Mineral spirits | 100 |
| Cobalt naphthenate | 0.8 |
| Manganese naphthenate | 0.8 |
| Lead naphthenate | 0.4 |
| Hydrazine | 0.1 |

15. A varnish composition comprising approximately 100 parts by weight of liquid polybutadine and on a weight basis, the following ingredients:

| | Parts |
|---|---|
| Mineral spirits | 100 |
| Cobalt naphthenate | 0.8 |
| Manganese naphthenate | 0.8 |
| Lead naphthenate | 0.4 |
| Hydrazine | 0.2 |

References Cited in the file of this patent

UNITED STATES PATENTS

| | | |
|---|---|---|
| 2,631,139 | Mahan | Mar. 10, 1953 |
| 2,638,460 | Crouch | May 12, 1953 |
| 2,652,342 | Gleason | Sept. 15, 1953 |
| 2,669,526 | Koenecke | Feb. 16, 1954 |
| 2,709,662 | Koenecke | May 31, 1955 |

FOREIGN PATENTS

| | | |
|---|---|---|
| 703,935 | Great Britain | Feb. 10, 1954 |